3,446,787
METHOD OF POLYMERIZING BUTADIENE BY MEANS OF A CATALYST CONTAINING ALUMINUM ALKYLS, ORGANONICKEL COMPOUNDS, TUNGSTEN OR MOLYBDENUM HEXAFLUORIDE
Morford C. Throckmorton and William M. Saltman, Akron, Ohio, assignors to The Goodyear Tire & Rubber Company, Akron, Ohio, a corporation of Ohio
No Drawing. Filed Mar. 20, 1967, Ser. No. 624,143
Int. Cl. C08d *1/14, 3/08*
U.S. Cl. 260—94.3
10 Claims

ABSTRACT OF THE DISCLOSURE

A method and a catalyst system for the solution polymerization of butadiene or butadiene in mixture with other diolefins to form polymers containing a high content of cis 1,4 addition is described. The solution polymerization is carried out under conventional polymerization conditions. The catalyst employed is a mixture of (1) organometallic compounds of metals of Groups I, II and III; (2) organonickel compounds and (3) tungsten hexafluoride or molybdenum hexafluoride.

---

This invention is directed to methods of polymerizing butadiene and butadiene in mixture with other diolefins to form polymers having a high content of cis 1,4 addition. It is also directed to catalyst systems useful for this purpose.

Polymers of butadiene or butadiene in mixture with other diolefins containing a high proportion of the butadiene units in the cis 1,4 configuration possess properties which make them useful as synthetic rubbers.

It is an object of this invention to provide a method whereby butadiene can be polymerized to a high content of cis 1,4 polybutadiene. Another object is to provide a catalyst system by which these polymerizations may be accomplished. Another object is to form copolymers of isoprene or other diolefins and butadiene in which the polybutadiene segment has a high content of cis 1,4 structure. Other objects will become apparent as the description proceeds.

According to the invention, butadiene or butadiene in combination with other diolefins is polymerized by contact under solution polymerization conditions with a catalyst comprising (1) at least one organometallic compound in which the metal is selected from Groups I, II and III of the periodic system, (2) at least one organonickel compound and (3) tungsten hexafluoride or molybdenum hexafluoride.

The organometallic compounds useful in this invention are organocompounds of such metals as lithium, sodium, potassium, rubidium, cesium, magnesium, calcium, strontium, beryllium, barium, zinc, cadmium, aluminum, gallium and indium. By the term, "organometallic" is meant alkyl, cycloalkyl, aryl, arylalkyl, alkaryl radicals are attached to the metal to form the organo compond of the particular metal.

Of the organometallic compounds useful in this invention, it is preferred to use organoaluminum compounds, organomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolyethylaluminum hydride, p-tolyl-n-propylaluminum hydride, p-tolylisoproplyaluminum hydride, benzylethylaluminum hydride, benzyl-n-propylaluminum hydride, and benzylisopropylaluminum hydride and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, tiroctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or RMgY where R may be alkyl, aryl, arylalkyl or alkaryl and Y is fluorine, or R'R"Mg where R' may be alkyl, aryl or alkaryl and R" may be either alkyl, aryl, arylalkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R–Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. Also, the organolithiumaluminum compounds may be used. These compounds respond to the formula R'R"$_3$LiAl where R' and R" may be alkyl, alkaryl or arylalkyl groups and R' and R" may or may not be the same group. Representative of these compounds are n-butyltriisobutyllithium aluminum, tetrabutyllithium aluminum, butyltriethyllithium aluminum, tetraisobutyllithium aluminum and styryltrinormalpropyllithium aluminum.

Representative of other organometallic compounds which may be employed in this invention are sodium, potassium, calcium, beryllium, cadmium and mercury alkyls, alkaryls, arylalkyls and aryls.

The component of the catalyst of this invention which contains nickel may be any organonickel compound. It is preferred to employ a soluble compound of nickel. These soluble nickel compounds are usually compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt of an organic acid containing from about 1 to 20 carbon atoms may be employed. Representative of such organonickel compounds are nickel benzoate, nickel acetate, nickel naphthenate, bis(alpha furyl dioxime) nickel, nickel octanoate, nickel palmitate, nickel stearate, nickel acetylacetonate, bis(salicylaldehyde) ethylene diimine nickel and nickel salicaldehyde. Nickel tetracarbonyl also may be employed as the nickel containing catalyst in this invention. The preferred component containing nickel is a nickel salt of carboxylic acid or an organic complex compound of nickel.

The third component of the catalyst, which is tungsten hexafluoride or molybdenum hexafluoride, should be, of course, anhydrous and as pure as possible. Tungsten hexafluoride usually exists as a gas at room temperature since it boils at about 19½° C. while molybdenum hexafluoride is a very volatile liquid which boils at about 35° C. For this reason, it is usually desirable to dissolve the tungsten or molybdenum hexafluoride in a solvent and charge them to the polymerization system as liquid solutions. The solvent may be any alkyl, aryl, alkaryl, or arylalkyl hydrocarbon. Benzene and heptane are examples of convenient solvents for this purpose.

The three catalyst components may be charged separately in either stepwise or simultaneous addition to the polymerization system or they may be mixed with one another in an inert solvent and this "preformed" catalyst can then be added to the monomer-solvent polymerization system.

The three component catalyst system of this invention has shown polymerization activity over a wide range of catalyst concentrations and catalyst ratios. The three catalyst components inter-react to form the active catalyst. As a result, the optimum concentration for any one catalyst is dependent upon the concentration of each of the other catalyst components. While polymerizations will occur over a wide range of cataylst concentrations and ratios, polymers having the most desirable properties are obtained over a narrower range. Polymerization will occur while the mole ratio of the organometallic compound (Me) to the organonickel compound (Ni) ranges from about 0.3/1 to about 300/1 and when the mole ratio of the tungsten or molybdenum hexafluoride (W) to the organonickel compound (Ni) ranges from about 0.33/1 to about 100/1 and where the mole ratio of the organometallic compound (Me) to the tungsten or molybdenum hexafluoride (W) ranges from about 0.1/1 to about 4/1. The preferred Me/Ni mole ratio ranges from about 2/1 to about 60/1; the preferred W/Ni mole ratio ranges from about 0.5/1 to about 50/1 and the preferred Me/W mole ratio ranges from about 0.5/1 to about 3/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are epntane, hexane, heptane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 30° C. and about 90° C. Ambient pressures are usually used but higher or lower pressures may be employed.

The practice of this invention is further illustrated by reference to the following examples which are intended to be representative rather than restrictive of the scope of this invention. Unless otherwise noted, all parts and percentages are by weight. The dilute solution viscosities (DSV) shown have been determined in toluene at 30° C.

Example 1

A purified butadiene in benzene solution containing 10 grams of butadiene per hundred milliliters of solution was charged to a number of 4-ounce bottles. Nitrogen was flushed over the surface of this premix while the catalyst was charged in the amounts shown in the table below. The catalyst employed was a mixture of triethylaluminum (TEAL), nickel octanoate (Ni salt or Ni oct) and tungsten hexafluoride (WF$_6$). The bottles were tumbled end over end for 18 hours in a water bath maintained at 50° C. The polymerizations were deactivated by the addition of one part per hundred of monomer (p.h.m.) of both an amine-type stopping agent and an antioxidant. The results are shown in the table below.

| Exp. No. | Millimoles/10 grams BD | | | Yield, percent | DSV |
|---|---|---|---|---|---|
| | TEAL | Ni salt | WF$_6$ | | |
| 1 | 0.06 | 0.005 | 0.03 | 50 | 4.64 |
| 2 | 0.06 | 0.005 | 0.05 | 68 | 2.45 |
| 3 | 0.06 | 0.005 | 0.00 | nil | |
| 4 | 0.06 | 0.000 | 0.05 | nil | |
| 5 | 0.06 | 0.000 | 0.30 | 100 | liquid |
| 6 | 0.00 | 0.005 | 0.05 | 86 | liquid |

| Exp. No. | Infrared analysis by weight percent | | |
|---|---|---|---|
| | Cis | Trans | 1,2- |
| 1 | 97.2 | 2.1 | 0.7 |
| 2 | 96.3 | 3.0 | 0.7 |
| 5 | 34.0 | 38 | [1] 2.0 |
| 6 | 70.0 | 17 | [1] 2.0 |

[1] Infrared indicated that the liquid polymers of Experiments 5 and 6 also contained about 25% and 10%, respectively, of a substituted aromatic.

These data illustrate that when a small amount of tungsten hexafluoride was present together with triethylaluminum and nickel octanoate, an elastomer containing 97% cis 1,4 polybutadiene and a DSV of 4.64 was produced. When no tungsten hexafluoride was present, polymerization did not occur. Although polymerization did occur in the absence of either triethylaluminum or nickel octanoate, only liquid polymers of low to intermediate cis contents were obtained. These data indicate that all three catalyst components must be present to produce a successful synthetic polybutadiene having rubber-like characteristics and containing a high cis 1,4 content.

Example 2

Polymers having fairly wide differences in molecular weights, as indicated by DSV, may be prepared by varying the catalyst concentrations and the ratios of the three catalyst components. Results illustrating this are presented in Table 2 below. The experimental conditions and the catalysts used were similar to those employed in Example 1. Small increases in the amount of $WF_6$ seem to significantly lower the DSV while increases in the TEAL concentrations seem to have the opposite effect. With the exception of the polymer formed in Experiment 11, the other polymers had a similar appearance to the polymer produced in Experiment 1 of Example 1 in that they were all about 97% cis 1,4 polybutadiene. The polymer of Experiment 11 was a liquid, and the cis 1,4 content was only 56.9% and the infrared analysis indicated it also contained some substituted aromatics. This seems to indicate that the use of high mole ratios of $WF_6$/TEAL results in lower molecular weight polybutadiene having decreased cis 1,4 contents.

TABLE II

| Exp. No. | Millimole/10 g. BD | | | Polymer yield, weight percent | DSV |
|---|---|---|---|---|---|
| | TEAL | Ni(Oct)$_2$ | $WF_6$ | | |
| 1 | 0.06 | 0.0035 | 0.03 | 36 | 4.70 |
| 2 | 0.05 | 0.0035 | 0.03 | 71 | 3.12 |
| 3 | 0.05 | 0.0035 | 0.04 | 77 | 2.14 |
| 4 | 0.08 | 0.005 | 0.04 | 69 | 4.19 |
| 5 | 0.08 | 0.005 | 0.05 | 79 | 2.91 |
| 6 | 0.08 | 0.005 | 0.06 | 80 | 2.23 |
| 7 | 0.10 | 0.005 | 0.06 | 74 | 3.03 |
| 8 | 0.10 | 0.005 | 0.10 | 65 | 1.30 |
| 9 | 0.15 | 0.010 | 0.10 | 86 | 1.89 |
| 10 | 0.30 | 0.010 | 0.30 | 70 | 0.92 |
| 11 | 0.06 | 0.010 | 0.30 | 78 | 0.28 |

Example 3

Polymerization of butadiene was carried out in the manner of Example 1 except that diethylaluminum fluoride (DEAF) was used as an alternate for triethylaluminum. The catalyst charged was 0.06 mm. of DEAF, 0.005 mm. of nickel octanoate, and 0.5 mm. of tungsten hexafluoride per 10 grams of butadiene. A yield of 70% was obtained. The DSV of this polymer was 0.9 and the infrared analysis revealed this polybutadiene contained 94.1% cis; 3.8% trans and 2.1% of 1,2 polybutadiene.

Example 4

Butadiene was polymerized in a manner similar to that of Example 1 except that either molybdenum hexafluoride ($MoF_6$) or chromium difluoride ($CrF_2$) was used as one of the catalyst components rather than tungsten hexafluoride. As illustrated by the data in the table below, $MoF_6$ formed an active catalyst when used in combination with TEAL and nickel octanoate. Infrared analysis of the solid polybutadiene produced in Experiment 2 indicated that it was 96.7% cis 1,4; 1.9% trans 1,4 and 1.4% 1,2 polybutadiene. The $CrF_2$ failed to produce an active catalyst when used with TEAL and Ni oct.

TABLE IV

| Exp. No. | Catalyst, millimole/10 g. BD | | | Polymer yield, wt. percent | DSV |
|---|---|---|---|---|---|
| | TEAL | Ni octanoate | MeF$_x$ | | |
| 1 | 0.06 | 0.005 | 0.05 MoF$_6$ | 39 | 4.79 |
| 2 | 0.06 | 0.005 | 0.06 MoF$_6$ | 64.5 | 4.88 |
| 3 | 0.06 | 0.005 | .075 CrF$_2$ | nil | |
| 4 | 0.10 | 0.010 | .6 CrF$_2$ | nil | |

Example 5

A series of polymerizations were conducted in the manner of Example 1 except that the solvent used was hexane instead of benzene and the polymerization time was 21 hours at 50° C. and employing the amounts of catalyst indicated in the table below.

TABLE V

| Exp. No. | Catalyst, millimole/9 g. BD | | | Polymer yield, wt. percent | DSV |
|---|---|---|---|---|---|
| | TEAL | Ni octanoate | $WF_6$ | | |
| 1 | 0.06 | 0.0025 | 0.04 | 67 | 5.07 |
| 2 | 0.06 | 0.005 | 0.04 | 80 | 4.45 |
| 3 | 0.06 | 0.010 | 0.04 | 91 | 3.85 |
| 4 | 0.06 | 0.0025 | 0.06 | 73 | 3.88 |
| 5 | 0.06 | 0.005 | 0.06 | 80 | 3.02 |
| 6 | 0.06 | 0.010 | 0.06 | 91 | 2.41 |
| 7 | 0.06 | 0.030 | 0.06 | 100 | 1.25 |
| 8 | 0.045 | 0.005 | 0.04 | 80 | 3.41 |
| 9 | 0.030 | 0.005 | 0.04 | 80 | 2.07 |

As shown by the data in Table V, the polymer viscosity was influenced markedly by the amount of each one of the catalysts charged.

Example 6

The polymer molecular weight and viscosity also are affected by the total catalyst concentration when the mole ratios of the three catalysts were held constant. This is illustrated in Table VI below. The polymerization conditions were the same as those utilized in Example 5.

TABLE VI

| Exp. No. | Catalyst, millimole/9 g. BD | | | Polymer yield, weight percent | DSV |
|---|---|---|---|---|---|
| | TEAL | Ni oct | $WF_6$ | | |
| 1 | 0.03 | 0.005 | 0.02 | 75 | 4.45 |
| 2 | 0.06 | 0.01 | 0.04 | 91 | 3.85 |
| 3 | 0.03 | 0.005 | 0.03 | 86 | 2.77 |
| 4 | 0.06 | 0.01 | 0.06 | 91 | 2.41 |

Example 7

Polymerizations were conducted in a manner similar to that of Example 5 except that the catalyst concentrations and mole ratios were varied as indicated in Table VIa below. The data presented in Table VIb below indicate that the catalyst mole ratios and catalyst concentrations are important in controlling the physical properties of the polymers produced in accordance with the practice of this invention.

TABLE VIa

| Exp. No. | Catalyst, millimoles/9 g. BD | | | Catalyst, mole ratio | | |
|---|---|---|---|---|---|---|
| | TEAL | Ni oct | $WF_6$ | Al/$WF_6$ | Al/Ni | $WF_6$/Ni |
| 1 | 0.06 | 0.03 | 0.02 | 3 | 2 | 0.67 |
| 2 | .60 | .01 | .36 | 1.67 | 60 | 36 |
| 3 | .02 | .005 | .02 | 1 | 4 | 4 |
| 4 | .30 | .01 | .50 | 0.6 | 30 | 50 |
| 5 | .02 | .005 | .04 | .5 | 4 | 8 |
| 6 | .045 | .005 | .08 | .56 | 9 | 16 |
| 7 | .06 | .005 | .20 | .3 | 12 | 40 |
| 8 | .03 | .005 | .08 | .37 | 6 | 16 |
| 9 | .10 | .03 | .5 | .2 | 3.3 | 16.7 |

TABLE VIb

| Exp. No. | Yield weight, percent | DSV | IR analysis, percent | | |
|---|---|---|---|---|---|
| | | | Cis- | Trans- | 1,2- |
| 1 | 69 | 4.03 | 97.2 | 2.1 | 0.7 |
| 2 | 71 | 2.89 | 97.5 | 1.6 | 0.9 |
| 3 | 88 | 2.89 | Not analyzed | | |
| 4 | 91 | 1.80 | 96.5 | 1.8 | 1.7 |
| 5 | 51 | 1.69 | 96.6 | 2.1 | 1.3 |
| 6 | 45 | 1.76 | 96.2 | 2.4 | 1.4 |
| 7 | 72 | 1.25 | 95.9 | 2.1 | 2.0 |
| 8 | 40 | [1] 0.60 | | | |
| 9 | 91 | 0.58 | 91.0 | 6.8 | 2.2 |

[1] Polymer No. 8 contained about 63% gel.

The effect of changing catalyst ratios is shown in Experiments 2 and 3 which had identical viscosities (DSV=2.89)

even though the total catalyst concentrations differed by some 18 fold (1.54 and 0.085 p.h.m. respectively). Similarly, Experiments 4 and 5 had approximately the same DSV although the catalyst concentration differed by about 11 fold.

The microstructure of the polymer was not significantly affected by wide variations in catalyst concentrations and ratios. This is indicated by a narrow range of from 95.9 to 97.5% cis 1,4 polybutadienes in the polymers of the first seven experiments wherein the mole ratios of the three catalyst components varied significantly. However, when the Al/WF$_6$ mole ratio is extremely low, the cis content seems to decline as evidenced by Experiment 9.

Example 8

In this example cobalt octanoate was attempted to be employed as a replacement of nickel octanoate. The polymerizations were conducted under conditions similar to that of Example 1 except that 0.05 millimole of TEAL, 0.005 millimole of cobalt octanoate and 0.03 millimole of WF$_6$ per 10 grams of butadiene were employed and the polymerization time was 17 hours at 50° C. These experiments resulted in a polybutadiene yield of only 19 weight percent. The DSV of this polybutadiene was 2.46 but the infrared analysis revealed that the polymer microstructure was only 83.3% cis 1,4, the remainder being 5.7% trans 1,4 and 11% 1,2.

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene and butadiene in mixture with other diolefins to form polymers containing a high proportion of the butadiene units in the cis configuration comprising contacting butadiene and butadiene in mixture with other diolefins under polymerization conditions with a catalyst comprising (1) at least one organometallic compound in which the metal is selected from Groups I, II and III of the Periodic System, (2) at least one organonickel compound selected from the group consisting of nickel salts of carboxylic acids, organic complex-compounds of nickel and nickel tetracarbonyl and (3) a metal fluoride selected from the group of tungsten hexafluoride and molybdenum hexafluoride.

2. The process according to claim 1 in which butadiene 1,3 alone is employed.

3. The process according to claim 1 in which the organonickel compound is selected from the group consisting of nickel salts of carboxylic acids and organic complex compounds of nickel.

4. The process according to claim 1 in which the organometallic compound is selected from the group consisting of organoaluminum compounds, organomagnesium compounds, organozinc compounds and organolithium compounds.

5. The process according to claim 1 in which the mole ratio of organometallic compound/organonickel compound ranges from about 0.3/1 to about 300/1, the mole ratio of the metal fluoride/organonickel compound ranges from about 0.33/1 to about 100/1 and where the mole ratio of the organometallic compound to the metal fluoride ranges from about 0.1/1 to about 4/1.

6. The process according to claim 1 in which the polymerization is conducted as a solution polymerization in an inert diluent.

7. The process according to claim 4 in which the organometallic compound is an organoaluminum compound.

8. The process according to claim 7 in which the organoaluminum compound is an aluminum trialkyl.

9. A catalyst composition comprising (1) at least one organometallic compound in which the metal is selected from Groups I, II and III of the Periodic System, (2) at least one organonickel compound selected from the group consisting of nickel salts of carboxylic acids, organic complex-compounds of nickel and nickel tetracarbonyl and (3) a metal fluoride selected from the group consisting of tungsten hexafluoride and molybdenum hexafluoride.

10. The composition according to claim 9 in which the mole ratio of the organometallic compound/organonickel compound ranges from about 0.3/1 to about 300/1, the mole ratio of the metal fluoride/organonickel compound ranges from about 0.33/1 to about 100/1 and the mole ratio of the organometallic compound/metal fluoride ranges from about 0.1/1 to about 4/1.

References Cited

UNITED STATES PATENTS

| 3,026,269 | 3/1962 | Cresham et al. | 252—429 |
| 3,118,864 | 1/1964 | Robinson et al. | 260—92.3 |

JAMES A. SEIDLECK, Primary Examiner.

R. A. GAITHER, Assistant Examiner.

U.S. Cl. X.R.

252—429; 260—82.1